Oct. 27, 1936. E. C. WOOLFREY 2,058,751
ANCHOR
Filed April 22, 1936
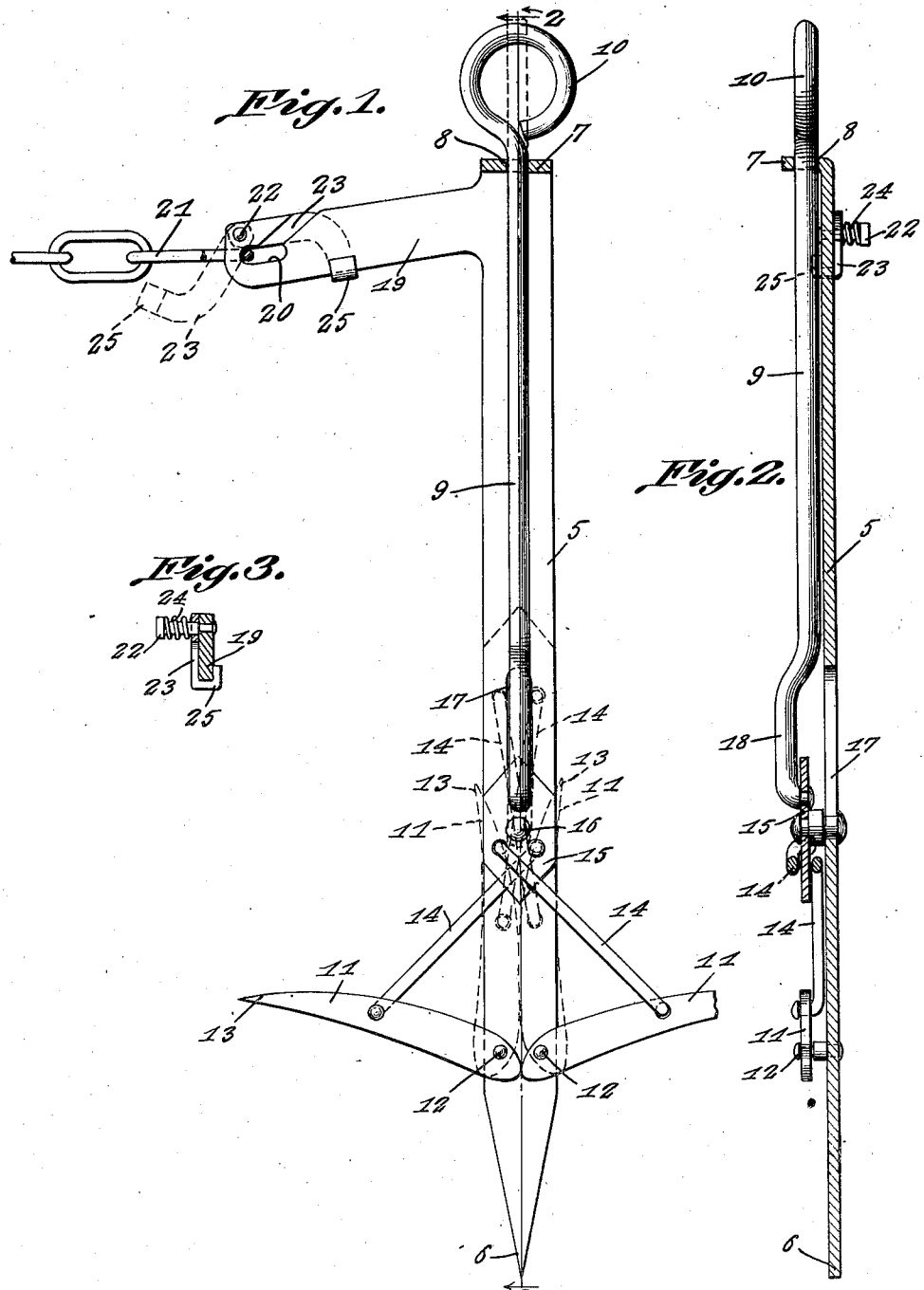
Ernest C. Woolfrey, INVENTOR
BY Victor J. Evans & Co.
ATTORNEYS Patented Oct. 27, 1936

2,058,751

UNITED STATES PATENT OFFICE 2,058,751

ANCHOR

Ernest C. Woolfrey, Edgehill, Va.

Application April 22, 1936, Serial No. 75,818

3 Claims. (Cl. 189—92)

The invention relates to an anchor and more especially to a trap ground anchor.

The primary object of the invention is the provision of an anchor, wherein the same is of novel construction so that it can be forced into the ground without requiring the necessity of making a hole in said ground and when pressed into the ground will become secure particularly for retaining a trap when set to avoid the carrying away of the trap by an animal when caught.

Another object of the invention is the provision of an anchor of this character, wherein the same when set within the ground will be firm and secure, yet the said anchor can be readily withdrawn from the ground should the occasion require for further use thereof.

A further object of the invention is the provision of an anchor of this character, which is simple in construction, thoroughly reliable and efficient in its operation, readily and easily embedded in and removed from a foundation, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is an elevation partly in section of the anchor constructed in accordance with the invention.

Figure 2 is a sectional view on the line 2—2 of Figure 1 looking in the direction of the arrows.

Figure 3 is a horizontal sectional view.

Similar reference characters indicate corresponding parts throughout the several views in the drawing.

Referring to the drawing in detail, the anchor comprises an elongated shank 5 preferably made from flat metal having a pointed end or tip 6 while at the other end is a right angular guide extension 7 having a hole 8 through which plays an actuating rod 9 terminating in a ring-like handle 10 above the extension 7. Swingingly connected to the shank 5 on opposite sides of the longitudinal center at a distance removed from the pointed or tip end 6 are curved holding fingers 11, these being pivoted at 12 for swinging movement and are formed with pointed outer free ends 13. Pivotally connected with the fingers 11 intermediate thereof are crossed links 14, these in their crossed relation being pivoted to a coupling plate 15 carrying a guide stud 16 working within an elongated slot 17 provided in the shank 5.

The plate 15 has pivoted thereto an outstruck lower end 18 built into the rod 9 so that the fingers 11 can be actuated, they normally being in uppermost position substantially parallel with the side edges of the shank 5 when the stud 16 is at the high end of the slot 17 in said shank and thus the shank can be readily embedded in the ground by pushing upon said shank. When the shank is embedded in the ground and to secure the same therein it is necessary to push downwardly upon the ring handle 10 of the rod 9 which throws the fingers 11 outwardly in spread relation to each other and thus secures the shank anchored. It is preferable to have the links 14 disposed at opposite sides of the plate 15 so as to avoid interference in the operation of the fingers 11 by the rod 9. The stud 16 indirectly acts as a guide for the rod 9 and supplements the extension 7 which functions to guide the rod 9 in its movements.

Formed with the shank 5 at its upper end is a branch arm 19 having opening through its top edge an angularly disposed bayonet slot 20 for accommodating a link of a chain 21 as carried by an animal trap so that the latter will be connected with the anchor through said chain 21. Fixed in this branch arm 19 is a headed pin 22 on which is swung a hook-like latch 23 which is adapted to straddle the slot 20 for closing the end opening through the top edge of the arm 19. Disposed about the pin 22 is a coiled tensioning spring 24 which places the latch 23 against the arm 19 so that its hook terminal 25 can engage the bottom edge of the arm 19 and thus prevent the release of the link 21 of the chain from the said slot 20 when engaged therein. By lowering the hook terminal 25 of the latch 23 with respect to the arm 19 and pulling upon this latch laterally against the resistance of the spring 24 the said latch can be freed for open swinging movement to permit of the release of the link 21 of the chain when it is desired to detach the trap from the anchor.

What is claimed is:

1. An anchor of the character described comprising a straight flat shank having a pointed tip and a right angular end remote from said tip, a pair of fingers pivoted to the shank removed from said tip, an actuating rod slidable through the right angular extension, a plate pivoted to said rod, crossed links pivoted to the plate and to said fingers, and a stud slidably connected with the shank and fixed to said plate.

2. An anchor of the character described comprising a straight flat shank having a pointed tip and a right angular end remote from said tip, a pair of fingers pivoted to the shank removed from said tip, an actuating rod slidable through the right angular extension, a plate pivoted to said rod, crossed links pivoted to the plate and to said fingers, a stud slidably connected with the shank and fixed to said plate, an arm extending laterally from the shank and having a bayonet slot, and a hook latch displaceably held on said arm and when engaged therewith by its hook being adapted to close the slot in said arm for the retention of a link of a chain engaged in said slot.

3. An anchor of the character described comprising a straight flat shank having a pointed tip and a right angular end remote from said tip, a pair of fingers pivoted to the shank removed from said tip, an actuating rod slidable through the right angular extension, a plate pivoted to said rod, crossed links pivoted to the plate and to said fingers, a stud slidably connected with the shank and fixed to said plate, an arm extending laterally from the shank and having a bayonet slot, a hook latch displaceably held on said arm and when engaged therewith by its hook being adapted to close the slot in said arm for the retention of a link of a chain engaged in said slot, a pin pivotally connecting the latch with said arm and permitting lateral displacement of the latch, and a spring on the pin for urging the latch in the direction of the arm upon said pin.

ERNEST C. WOOLFREY.